United States Patent [19]

Mehoudar

[11] Patent Number: 4,573,640
[45] Date of Patent: Mar. 4, 1986

[54] IRRIGATION EMITTER UNIT
[75] Inventor: Raphael Mehoudar, Tel-Aviv, Israel
[73] Assignee: Hydro-Plan Engineering Ltd., Tel-Aviv, Israel
[21] Appl. No.: 445,998
[22] Filed: Dec. 1, 1982

Related U.S. Application Data

[63] Continuation-in-part of Ser. No. 143,098, Apr. 23, 1980, Pat. No. 4,384,680, which is a continuation-in-part of Ser. No. 845,277, Oct. 25, 1977, Pat. No. 4,209,133, and a continuation-in-part of Ser. No. 312,910, Oct. 19, 1981, abandoned, which is a continuation of Ser. No. 164,844, Jun. 30, 1980, abandoned, which is a continuation of Ser. No. 962,688, Nov. 21, 1978, Pat. No. 4,210,287.

[30] Foreign Application Priority Data

Oct. 26, 1976 [IL] Israel ............................... 50766
Nov. 24, 1977 [IL] Israel ............................... 53463

[51] Int. Cl.⁴ ............................................. A01G 25/02
[52] U.S. Cl. ...................................................... 239/542
[58] Field of Search .............. 239/542, 547, 271, 272, 239/570, 571, 533.1; 138/42–46

[56] References Cited

U.S. PATENT DOCUMENTS 3,777,980 12/1973 Allport ........................... 239/542 X
3,807,430 4/1974 Keller ............................. 239/542 X
3,979,070 9/1976 Lemelshtrich ................... 239/542
3,998,427 12/1976 Bentley ........................... 239/542 X Primary Examiner—Andres Kashnikow
Attorney, Agent, or Firm—Browdy and Neimark

[57] ABSTRACT

An irrigation emitter unit comprises an elongated body member having formed in a first surface thereof an elongated groove formed with a pair of oppositely directed flow resisting substantially triangular baffles, the groove having an inlet end and an outlet end, there being furthermore formed in the first surface a recessed cavity of elongated shape and being of extended dimensions as compared to the width of the groove, the outlet end of said groove communicating with the cavity so that the groove extends out of the cavity and is located on one side thereof, there being formed in the base of the cavity an outlet aperture extending to a second and opposite surface of the body member and having a rim area substantially less than that of the recessed cavity, a resiliently flexible membrane of substantially elongated shape juxtaposed with respect to the surface so as to be pressed sealingly thereagainst solely under the influence of fluid pressure and so as to define, with said groove, an elongated flow reducing flowpath; with the groove inlet a flowpath inlet; and with the cavity an outlet control chamber and communication being effected between an irrigation supply and said flowpath inlet and so as to allow for the exertion of the fluid pressure on the membrane; the arrangement being such that upon the fluid pressure acting on the membrane exceeding the fluid pressure in the outlet chamber by a predetermined amount, the membrane flexes elastically towards the outlet aperture so as to define, with a rim of the outlet aperture, a restricted outflow path thereby limiting variations in the outflow rate.

10 Claims, 5 Drawing Figures

IRRIGATION EMITTER UNIT

The present application is a continuation-in-part of copending application Ser. No. 143,098 filed 4/23/80 entitled "A Fluid Flow Regulator Unit", now U.S. Pat. No. 4,384,680, which in turn is a continuation-in-part of application Ser. No. 845,277, filed 10/25/77 entitled "Drip Level Irrigation Emitter Unit", now U.S. Pat. No. 4,209,133. The present application is also a continuation-in-part of copending application Ser. No. 312,910 filed 10/19/81 entitled "Drip Irrigation System" (now abandoned) which in turn is a continuation of application Ser. No. 164,844 filed 6/30/80 entitled "Drip Irrigation System" (now abandoned) which in turn was a continuation of application Ser. No. 962,688 filed 11/21/78 entitled "Drip Irrigation System", now U.S. Pat. No. 4,210,287.

My copending application Ser. No. 143,098 filed 4/23/80 discloses and illustrates an irrigation emitter unit having a flow restricting flowpath communicating at one end thereof with an emitter unit inlet (adapted to be coupled to an irrigation supply) and at another end with an outlet control chamber, which chamber is provided with an outer aperture and, spaced therefrom, a defining rim of substantially greater area than that of the outlet aperture and against which a resiliently flexible membrane is adapted to be pressed, solely under the influence of the pressure of said irrigation supply, the arrangement being such that upon said irrigation supply pressure exceeding the liquid pressure in the outlet control chamber by more than a predetermined amount, the membrane flexes elastically towards the outlet aperture so as to define, with a rim of the aperture, a restricted outflow path thereby limiting variation in the outflow rate of the emitter unit. Such an emitter unit provided with such a mechanism for ensuring minimal variations in outflow rate for a wide degree of variations in the irrigation supply pressure will hereinafter be referred to as an emitter unit of the kind specified.

My copending application Ser. No. 312,910 discloses and illustrates a drip irrigation system wherein emitter units of the kind specified are bonded to the inner surface of an irrigation pipe at spaced apart locations. Here however the emitter units, in addition to being specially adapted for the bonding to the pipe, are characterised in that the flexible membrane thereof, in addition to its differential pressure control functions also serves to define, together with an emitter unit body, the flow restriction flowpath.

According to the present invention there is provided an irrigation emitter unit comprising a body member having formed in a first surface thereof an elongated groove, having an inlet end and an outlet end debouching into a recessed cavity formed in said first surface and being of extended dimensions as compared to the width of said groove, there being formed in the base of said cavity an outlet aperture extending to a second and opposite surface of said body member and having a rim area substantially less than that of the recessed cavity; a resiliently flexible membrane juxtaposed with respect to said first surface so as to be pressed towards the first surface under the influence of fluid pressure so as to define with said groove, an elongated flow reducing flowpath; with said groove inlet a flowpath inlet and with said cavity an outlet control chamber and communication means for effecting communication between an irrigation supply and said flowpath inlet and so as to allow for the exertion of said fluid pressure on said membrane; the arrangement being such that upon the fluid pressure acting on said membrane exceeding the fluid pressure in the outlet chamber by a predetermined amount, the membrane flexes elastically towards the outlet aperture so as to define, with a rim of the outlet aperture a restricted outflow path thereby limiting variations in the outflow rate.

With an irrigation emitter unit in accordance with the invention, the provision of the resiliently flexible membrane and its location between the outlet control chamber and the irrigation supply ensures that the liquid pressure in the outlet chamber is always a predetermined fixed amount less than that of the supply. By virtue of the fact that the membrane is spaced from the outlet aperture, the displacement of the membrane towards the aperture over the major portion of this spacing is not effective in exercising any significant control on the emission flow rate and it is only upon displacement of the membrane over the residual, relatively minor spacing towards the aperture that such control is exercised. In this way it is ensured that pressure control is only exercised once the pressure differential has been established and that the provision of the control mechanism itself does not give rise to undesirable pressure losses during the build-up of this differential.

The requirement that the outlet aperture should be of substantially smaller area than that of rim area against which the membrane is pressed is essential seeing that the larger the area of the aperture the more does the magnitude of the inflow pressure affect the control and hence the less effective the control.

With a drip level irrigation emitter unit in accordance with the invention any blockage of the outflow aperture, for example as a consequence of the ingress of surrounding dirt, grit or the like, results in a reduction in the pressure drop along the flow reducing flowpath with a consequential increase in the pressure in the outlet control chamber and therefore a reduction in the pressure differential acting on the membrane and the elastic return of the membrane to a less displaced condition. Thus the outflow path becomes de-restricted and the increased pressure in the outlet control chamber results in the flushing out of the blockage from the aperture. A similar situation obtains in the control mechanism during the build-up of the pressure differential upon the onset of irrigation flow and during the dying down of the differential when the irrigation supply is cut off. In both cases the relatively unrestricted outflow path allows for the liquid pressure in the outlet chamber to flush out obstructions from the outlet aperture. In this way the emitter unit can be considered as being self-flushing.

It will be understood that pressure control is effected solely in the region of the outlet control chamber, the membrane and its pressing against the groove is substantially ineffective in varying dimensions of the flowpath itself.

It will be appreciated that the degree of pressure control to be effected by the membrane depends to a great extent on the degree of resilience of the membrane. Quite clearly, this degree of resilience is increased when the membrane effectively floats as compared to the condition where the edges of the membrane are mechanically clamped. Thus, the mechanical clamping of the member introduces tolerances into the manufacture of the unit and this in turn affects the accuracy of pressure control. Furthermore, a clamped membrane, once detached from its clamped position, under the influences of pressure, could not return to its clamped position, and a unit including such a clamped membrane would therefore be useless for further use until repaired. This is not the case where, as in the present case the membrane effectively floats. Finally, when the membrane is clamped, control is effected as a consequence of both the bending and the resilience of the membrane; but when it floats, control is only dependent on the bending of the membrane and such a membrane is much more simple to manufacture and in point of fact relatively cheap materials can be utilized therefore.

Furthermore, the provision of an emitter unit with such a loosely retained membrane which is pressed towards the body surface under fluid pressure simplifies considerably the construction of the emitter unit seeing that there are now no longer rigorous requirements for the component portions of the emitter unit to be sealed to each other in a fluid tight fashion.

PRIOR ART

There have been many proposals to provide irrigation emitter units with pressure control involving the use of flexible membranes. In all cases however this has involved a flexible membrane which bears against a flow reducing channel the membrane being deformed by the supply pressure so as to project into or out of the channel and thereby to vary the cross-sectional area of the entire channel in accordance with the applied pressure. With such units in accordance with this prior proposal, wherein pressure control is exerted along the entire length of the flow restricting channel, should blockage of the channel take place at any portion thereof, flow through the unit ceases and there can be no question of the self-flushing or self-cleansing of the device. Similarly where blockage takes place at the outlet of the device. In fact, once blockage takes place at any intermediate position of the channel, the portion, in the channel downstream of this blockage is automatically closed by the membrane being pressed into it and in this way the very provision of the membrane of the kind used in those prior units serves to aggravate any blockage. In contradistinction thereto, with the emitter unit in accordance with the present invention, control is effected solely by the displacement of the membrane vis-a-vis the control chamber at the outlet of the unit and there is no effective displacement of the membrane into the flowpath.

Examples of such prior art emitter units are U.S. Pat. No. 3,815,636 (having a membrane fixed at its edges) and U.S. Pat. Nos. 3,777,980, 3,815,636 and 3,954,223 (having membranes which are displaced into defining the flowpaths under the influence of supply pressure).

In no case is there disclosed an emitter unit wherein pressure control is effected by the displacement of a freely displaceable resilient membrane into and out of a control chamber so as to maintain a predetermined differential pressure across the membrane, the membrane at the same time serving to define with the emitter body the flow reducing flowpath of the emitter unit.

For a better understanding of the present invention and to show how the same may be carried out in practice, reference will now be made to the accompanying drawings in which.

Figure 1:
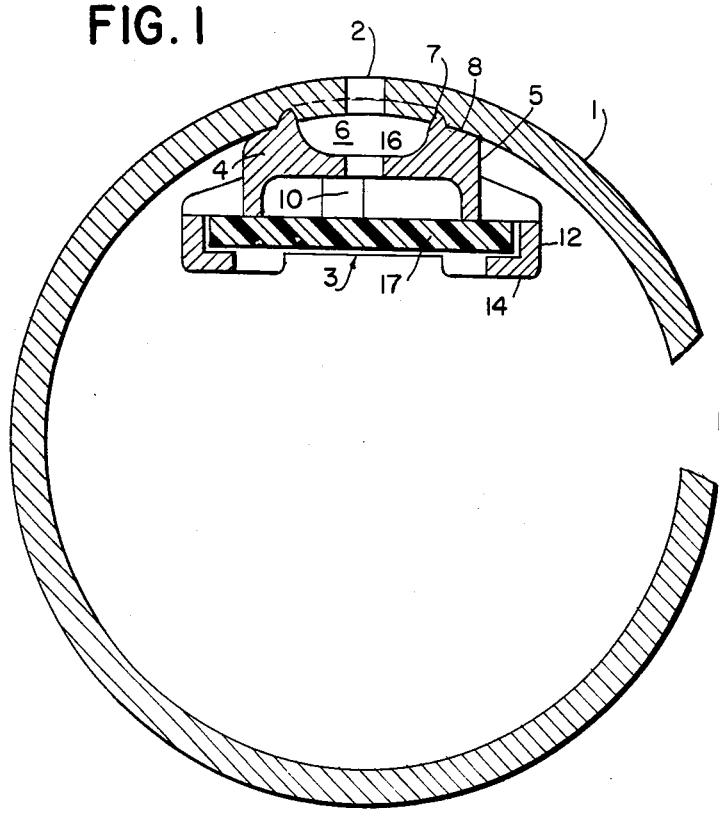
FIG. 1 is a cross-sectional view, on an enlarged scale of an emitter unit in accordance with the present invention shown fitted in an irrigation conduit.

As seen in FIG. 1 of the drawings a thin walled conduit 1 is formed of a heat sealable thermoplastic material such as, e.g. polyethylene or the like and is provided with axially spaced apart conduit outlet apertures 2. Heat welded to the inner surface of the conduit 1 at axially spaced apart locations (in which are respectively located the apertures 2) are emitter units 3.

Figure 2:
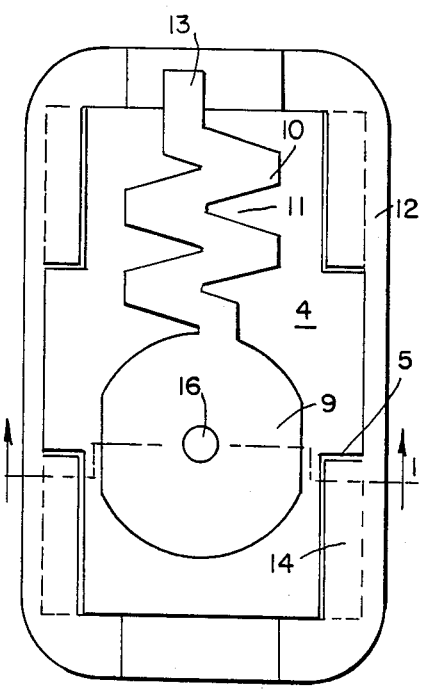
FIG. 2 is a plan view, from below, of the emitter unit shown in FIG. 1 with a cover member thereof removed.
Figure 3:
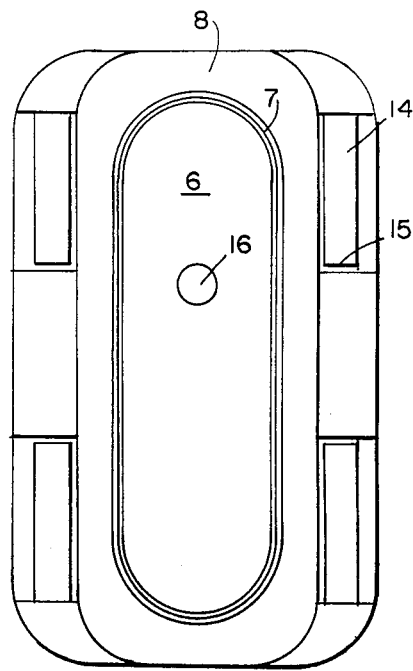
FIG. 3 is a plan view from above of the emitter unit shown in FIG. 1.

As seen in FIGS. 1, 2 and 3 of the drawings each emitter unit 3 comprises a relatively elongated shallow body member having a transverse base 4 from which there extends (upwardly as shown in FIG. 1) an elongated peripheral wall 5 defining an elongated well 6 and terminating in a peripheral edge portion 7 which adjoin sloping shoulder portions 8.

Formed in the under surface of the base 4 is a substantially elongated cavity-like recess 9 which communicates with one end of an elongated groove 10 formed with a pair of oppositely directed sets of flow resisting, substantially triangular baffles 11. Extending downwardly (as seen in FIG. 1) from the base 4 is a peripheral wall 12 in a transverse portion of which is formed an inlet recess 13 which communicates with an opposite end of the groove 10. Formed integrally with corner portions of the peripheral wall 12 are inwardly directed retaining flanges 14 spaced from the adjacent surface of the base 4 and juxtaposed with respect to molding core windows 15 formed in the base 4.

A throughgoing bore 16 extends through the base from a central position in the recess 9 so as to communicate with the well 6.

A rectangular, flexibly resilient rubber membrane 17 is loosely retained by the flanges 14 and constitutes an emitter cover member which serves to define, when pressed, by fluid pressure, against the under surface of the base 4 with the elongated groove 10, a flow restricting flowpath. The recess 13 constitutes an emitter inlet whilst the bore 16 and well 6 constitute together an emitter outlet. Thus, with the emitter units forming part of the irrigation system the location of the units in the conduit is instrumental in effecting communication between the irrigation supply flowing through the conduit and the inlet and so as to exert fluid pressure on the membrane. It will be readily seen that the surface area of the cavity 9 is very substantially greater than the surface area of the mouth of the bore 16.

The emitter units 3 are heat welded at their peripheral edge portions 7 to the inner surface of the conduit 1 at axially spaced apart locations. This heat welding takes place during the extrusion process of the conduit when the conduit is still in a highly plastic condition. Subsequent to the heat welding the conduit is apertured so as to form the outlet apertures thereof.

It will be readily seen that the flow restricting flowpath, defined by the groove 10 and the membrane cover member 17, is spaced from and thermally shielded from the inner surface of the conduit and is therefore not subject to the possibly distorting influence or blockage arising out of the heat welding process. Furthermore, by virtue of the fact that the emitter outlet includes the relatively widely dimensioned well 6 it is ensured, on the one hand, that the heat welding process does not result in blockage of the relatively narrow outlet bore 16 and, on the other hand, the subsequent aperturing of the conduit can take place anywhere in the region of the conduit contiguous with the extended well 6 and this of course considerably simplifies the process of aperturing.

In use, and with the flow of irrigation liquid through the conduit, once the pressure build-up of the liquid in the conduit has reached a certain minimum level, the loosely retained, flexible membrane 17 is pressed against the rim of the groove 10 and of the cavity 9. Thus a portion of the irrigating water flowing through the conduit 1 passes through the flow restricting flowpath defined by the groove 10 and the flexible membrane 17 into the cavity 9 and out of the emitter via the bore 16 and well 6 so as to emerge from the conduit via the conduit outlet aperture 2 as a substantially pressureless drip. The cavity 9 defines, together with the membrane 17, an outlet control chamber and the provision of the resiliently flexible membrane 17 and its location between the outlet control chamber and the interior of the conduit ensures that the liquid pressure in the outlet control chamber is always a predetermined fixed amount below that prevailing in the conduit. Thus variations in the throughflow pressure in the conduit immediately gives rise to a displacement of the membrane so as to maintain the pressure differential constant and in this way it is ensured that the outflow rate from the emitter unit remains substantially invariant with respect to such pressure variations. On the other hand, the membrane is such that the pressure of the liquid is not effective in significantly pressing it into the groove 10 so as to alter the dimensions of the flowpath and therefore control is effected substantially exclusively at the outlet control chamber.

This maintenance of a substantially constant pressure differential with the pressure in the outlet control chamber (cavity 9) being less than the pressure in the conduit by a fixed predetermined amount (but being significantly greater than zero) carries with it the implication that the flow restricting flowpath is not required to effect pressure reduction down to zero. This consideration simplifies the constructional requirements for the flow restricting flowpath. Thus, in the example illustrated in FIGS. 1 and 2 a relatively short groove with relatively few triangular baffles is sufficient to reduce the flow pressure from that in the conduit (mains supply pressure) to that in the control chamber (e.g. 2½ meters of water). The subsequent reduction of pressure is achieved by the passage through the well 6 as restricted by the membrane 17 and the exit out of the aperture 2.

By virtue of the fact that the membrane 17 is pressed towards the undersurface of the base 4 by the fluid pressure in the conduit 1 carries with it the implication that the emitter unit can and is formed of only two components, no additional component being required to press the membrane into a sealing position.

Figure 4:
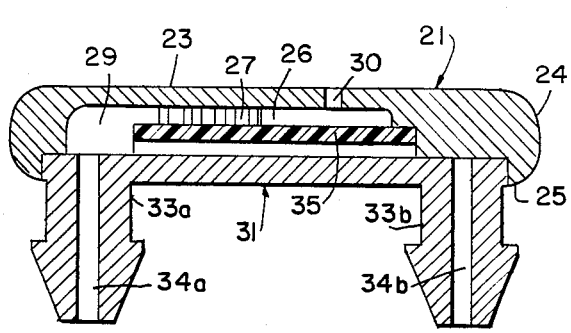
FIG. 4 is a longitudinally sectioned view of a further form of emitter unit in accordance with the invention.
Figure 5:
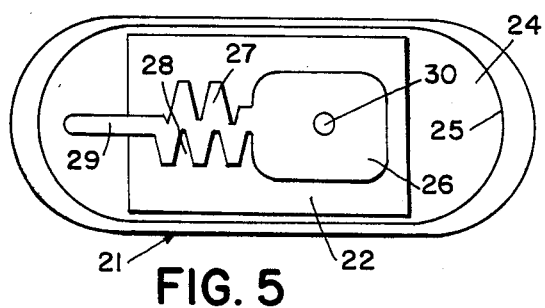
FIG. 5 is a plan view from below of a body member of the emitter unit shown in FIG. 4.

The emitter unit illustrated in FIGS. 4 and 5 of the drawings comprises an elongated shallow body member 21 is formed with an inner, substantially planar surface 22 and an outer substantially planar surface 23 and a surrounding skirt 24 having a peripheral rim 25.

Formed in the surface 22 is an elongated cavity-like recess 26 which communicates with one end of an elongated groove 27 formed with a pair of oppositely directed sets of flow resisting, substantially triangular baffles 28. The opposite end of the groove 27 communicates with a recess 29 formed in the skirt 24.

A throughgoing bore 30 extends through the body member 21 from the base of the recess 26 to the outer surface 23 and constitutes an emitter outlet.

An emitter base member 31 fits into a recess formed in the body member 21 defined by the rim 25 and the undersurface of the skirt 24 and is secured to the body member 21 by ultrasonic welding or the like. The base member 31 is provided with a pair of coupling nipples 33a and 33b having throughgoing bores 34a and 34b. The bore 34a communicates with the recess 29 and constitutes an effective emitter inlet. The bore 34b is effectively sealed by the undersurface of the skirt 24.

Prior to the securing of the base member 31 to the body member 21 there is located within the body member adjacent the inner surface 22 thereof an elongated flexibly resilient rubber membrane 35 which, as can be seen is retained loosely within the body member 21.

The provision of the base member 31 with two identically bored coupling nipples 33a and 33b facilitates easy assembly of the emitter unit seeing that irrespective of the mutual orientation of the body and base members one coupling nipple always serves as an emitter inlet whilst the other is effectively sealed.

In use the emitter unit is mechanically and hydraulically coupled to a conduit (not shown) by the insertion and location of the two coupling nipples 33a and 33b in appropriate apertures formed in the conduit wall, the elongated emitter unit being located along the length of the conduit and being retained in this position by the retention of the two coupling nipples in the conduit.

The action of the irrigation supply when entering the emitter unit via the bore 34a in initially flushing through the path 27 and outlet bore 30 and subsequently, when its pressure has sufficiently risen in pressing the membrane against the inner surface 22 so as to define the flowpath and control chamber is similar to that described above with regard to the emitter unit illustrated in FIGS. 1-3 of the drawings as is the action of the membrane 35 in exercising differential pressure control.

It will be realised however that the fact that membrane is effective in sealingly defining the flowpath and the control chamber considerably simplifies manufacturing and assembly of the emitter unit seeing that both in the manufacture and in the assembly it is no longer required to ensure fluid tight sealing between the component parts.

The provision of the elongated recess 26 and the consequential elongated control chamber defined with the membrane allow, on the one hand that the overall width of the control chamber is kept relatively low so as to ensure that the emitter unit as a whole should not project substantially beyond the conduit to which it is attached, and on the other hand that the control chamber as a whole is of substantial size. This latter factor is of considerable importance seeing that the larger to control chamber the larger the emitter outlet aperture can be and the less likely it is to become blocked. Furthermore, with a relatively large outlet control chamber, the thickness of the membrane is no longer subject to such finely defined tolerances.

I claim:

1. An irrigation emitter unit comprising an elongated body member having formed in a first surface thereof an elongated groove formed with a pair of oppositely directed flow resisting baffles, said groove having an inlet end and an outlet end, there being furthermore formed in said first surface a recessed cavity of elongated shape and being of extended dimensions as compared to the width of said groove, said outlet end of said groove communicating with said cavity so that said groove extends out of said cavity and is located on one side thereof, there being formed in the base of the cavity an outlet aperture extending to a second and opposite surface of the body member and having a rim area substantially less than that of the recessed cavity, a resiliently flexible membrane of substantially elongated shape juxtaposed with respect to said first surface so as to be pressed towards said first surface under the influence of fluid pressure so as to define with said groove, an elongated flow reducing flowpath; with said groove inlet a flowpath inlet; and with said cavity an outlet control chamber and communication means for effecting communication between an irrigation supply and said flowpath inlet and so as to allow for the exertion of said fluid pressure on said membrane; the arrangement being such that upon the fluid pressure acting on said membrane exceeding the fluid pressure in the outlet chamber by a predetermined amount, the membrane flexes elastically towards the outlet aperture so as to define, with a rim of the outlet aperture a restricted outflow path thereby limiting variations in the outflow rate.

2. An irrigation emitter unit according to claim 1 wherein said body member comprises a transverse wall portion, a peripheral rim formed integrally with and extending from a first face of said wall portion and defining a well of extended dimensions as compared with said outlet aperture, said groove and cavity being formed in a second and opposite face of said wall portion, a peripheral skirt extending from said second face and around said groove and cavity and formed integrally with a plurality of retaining flanges, said membrane being loosely retained by said flanges, said outlet bore extending through said wall bore.

3. An irrigation emitter unit according to claim 2 wherein said body member is of substantially rectangular shape, said retaining flanges being located at the corners thereof and being juxtaposed with respect to corresponding molding core windows formed in said wall portion.

4. An irrigation emitter unit comprising a body member having formed in a first surface thereof an elongated groove, having an inlet end and an outlet end debouching into a recessed cavity formed in said first surface and being of extended dimensions as compared to the width of said groove, there being formed in the base of said cavity an outlet aperture extending to a second and opposite surface of said body member and having a rim area substantially less than that of the recessed cavity; a resiliently flexible membrane juxtaposed with respect to said first surface so as to be pressed towards the first surface under the influence of fluid pressure and so as to define with said groove, an elongated flow reducing flowpath; with said groove inlet a flowpath inlet and with said cavity an outlet control chamber and communication means for effecting communication between an irrigation supply and said flowpath inlet and so as to allow for the exertion of said fluid pressure on said membrane; the arrangement being such that upon the fluid pressure acting on said membrane exceeding the fluid pressure in the outlet chamber by a predetermined amount, the membrane flexes elastically towards the outlet aperture so as to define, with a rim of the outlet aperture a restricted outflow path thereby limiting variations in the outflow rate.

5. An irrigation emitter unit according to claim 4 wherein said groove extends out of said cavity and is located on one side thereof.

6. An irrigation emitter unit according to claim 5 wherein said body member and said membrane are of substantially elongated shape.

7. An irrigation emitter unit according to claim 6 wherein said cavity is of substantially elongated shape.

8. An irrigation emitter unit according to claim 4 wherein said groove is formed with a pair of oppositely directed, flow resisting, baffles.

9. An irrigation emitter unit according to claim 4 wherein said body member comprises a transverse wall portion, a peripheral rim formed integrally with and extending from a first face of said wall portion and defining a well of extended dimensions as compared with said outlet aperture, said groove and cavity being formed in a second and opposite face of said wall portion, a peripheral skirt extending from said second face and around said groove and cavity and formed integrally with a plurality of retaining flanges, said membrane being loosely retained by said flanges and said outlet bore extending through said wall portion.

10. An irrigation emitter unit according to claim 9 wherein said body member is of substantially rectangular shape, said retaining flanges being located at the corners thereof and being juxtaposed with respect to corresponding molding core windows formed in said wall portion.

* * * * *